US007083875B2

(12) United States Patent
Lillis et al.

(10) Patent No.: US 7,083,875 B2
(45) Date of Patent: Aug. 1, 2006

(54) METHOD AND APPARATUS FOR PROVIDING MODULAR POWER

(75) Inventors: Mark Lillis, South Windsor, CT (US); A. John Speranza, West Hartford, CT (US); Dean Halter, West Hartford, CT (US); Hermin Yi, Ft. Lee, NJ (US); Kim Summa, Clarks Summitt, PA (US); Phil Tombaugh, New Haven, CT (US); Matthew Christopher, Manchester, CT (US); Iris Shiroma, New Haven, CT (US); Spyros Nomikos, New Britain, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 357 days.

(21) Appl. No.: 10/420,633

(22) Filed: Apr. 22, 2003

(65) Prior Publication Data
US 2003/0215680 A1 Nov. 20, 2003

Related U.S. Application Data

(60) Provisional application No. 60/374,377, filed on Apr. 22, 2002.

(51) Int. Cl.
*H01M 8/06* (2006.01)
*H01M 8/24* (2006.01)
*H01M 2/10* (2006.01)

(52) U.S. Cl. ............................. 429/21; 429/34; 429/38; 429/99

(58) Field of Classification Search .................. 429/19, 429/20, 21, 34, 38, 39, 99
See application file for complete search history.

(56) References Cited

U.S. PATENT DOCUMENTS

| 4,778,579 | A | 10/1988 | Levy et al. .................. 204/129 |
| 4,883,724 | A | 11/1989 | Yamamoto .................... 429/23 |
| 5,298,874 | A | 3/1994 | Morel et al. .................... 335/8 |
| 5,360,679 | A | 11/1994 | Buswell et al. ............... 429/19 |
| 5,401,589 | A | 3/1995 | Palmer et al. ................. 429/13 |
| 6,030,718 | A * | 2/2000 | Fuglevand et al. ........... 429/26 |
| 6,368,740 | B1 * | 4/2002 | Dristy ....................... 429/39 X |
| 6,468,682 | B1 * | 10/2002 | Fuglevand et al. ....... 429/34 X |
| 6,828,049 | B1 * | 12/2004 | Bullock et al. ............... 429/23 |
| 2003/0082427 | A1 * | 5/2003 | Prasad et al. .................. 429/34 |
| 2004/0043274 | A1 * | 3/2004 | Scartozzi et al. ............. 429/34 |
| 2005/0004716 | A1 | 1/2005 | Lillis et al. ................. 700/287 |

OTHER PUBLICATIONS

PCT Search Report—Form PCT/ISA/210. Application No. PCT/US03/12336, filed Apr. 22, 2003. International Search Report mailed Dec. 5, 2003.

* cited by examiner

*Primary Examiner*—Stephen J. Kalafut
(74) *Attorney, Agent, or Firm*—Cantor Colburn LLP

(57) ABSTRACT

A modular power system having separately removable electrolysis and power modules, each with separate sets of connection ports, is disclosed. The connection port set of the electrolysis module is adapted for operable communication with a water supply, a hydrogen storage device, and the power module, and the connection port set of the power module is adapted for operable communication with the water supply, the hydrogen storage device, and the electrolysis module.

19 Claims, 15 Drawing Sheets

METHOD AND APPARATUS FOR PROVIDING MODULAR POWER

CROSS REFERENCE TO RELATED APPLICATIONS

This application claims the benefit of U.S. Provisional Application Ser. No. 60/374,377, filed Apr. 22, 2002, which is incorporated by reference in its entirety.

BACKGROUND

This disclosure relates generally to a modular power system, and more particularly to a modular power system having modular components configured to allow system flexibility and accessibility while efficiently utilizing the space within an enclosure in which the modular power system is housed.

Discrete distributed power systems are utilized in numerous applications, including backup power for high value commercial equipment such as telecommunications infrastructure, and backup or primary power to commercial and residential buildings, for example. A typical primary power system may include a power source such as a diesel or gasoline powered generator, a fuel storage tank, and a set of batteries to store energy. In applications involving backup power for telecommunications equipment, batteries are exclusively utilized to maintain the operation of the equipment for a fixed period of time as required by government regulations. The batteries are typically rack mounted into standard size enclosures to facilitate installation and maintenance of the system. Ease of installation and low cost maintenance is needed in telecommunications applications where a system operator may have hundreds of battery enclosures located in a given region, all of which must be periodically maintained to ensure reliable service.

In response to problems associated with batteries, such as battery life for example, several technologies, such as flywheels and fuel cells, have been proposed to replace battery-type power systems. However, due to space constraints within the enclosure of the power system, problems associated with the use of non-planar objects, such as cylindrically-shaped flywheels for example, arise. Since power system enclosures are typically constructed of panels arranged to form a polyhedral enclosure, the use of non-planar objects may result in the inefficient use of space. Accordingly, customed designed enclosures are oftentimes employed, which may make it difficult and costly for a user, such as a telecommunications company with large base of installed equipment for example, to implement new power system technologies.

While existing power systems are suitable for their intended purposes, there still remains a need for improvements. In particular, a need exists for a flexible power system that is retrofitable into an existing system enclosure while facilitating access to the various components of the system, and for a power system that provides for economy of space within the system enclosure.

SUMMARY

In one embodiment, a modular power system having separately removable electrolysis and power modules, each with separate sets of connection ports, is disclosed. The connection port set of the electrolysis module is adapted for operable communication with a water supply, a hydrogen storage device, and the power module, and the connection port set of the power module is adapted for operable communication with the water supply, the hydrogen storage device, and the electrolysis module.

In another embodiment, an apparatus for a modular power system includes a cabinet having an access surface with a set of connection ports. The cabinet is configured to house a module that may include an electrolysis module, a fuel cell module, a hydrogen-fueled generator module, or a controller module. The connection port set is in operable communication with the module.

In a further embodiment, an apparatus for a modular power system includes a water storage module integral with a hydrogen storage module to provide a water-hydrogen storage module. The water-hydrogen storage module includes connection ports to facilitate fluid communication with the modular power system.

In yet another embodiment, a method of maintaining a modular power system is disclosed. The connection port set of a first module is disconnected from the modular power system and the first module removed. The first module is replaced with a second module of like kind and the connection port set of the second module is connected to the modular power system.

In yet a further embodiment, a method of upgrading a modular power system is disclosed. The connection port set of a first module is disconnected from the modular power system and a second module is added by connecting the connection port sets of the first and second modules to the modular power system.

BRIEF DESCRIPTION OF THE DRAWINGS

Referring now to the drawings wherein like elements are numbered alike in several Figures.

DETAILED DESCRIPTION

Embodiments of the invention provide a method and apparatus for providing modular power in a flexible power system defined by various operating modules.

Figure 1:
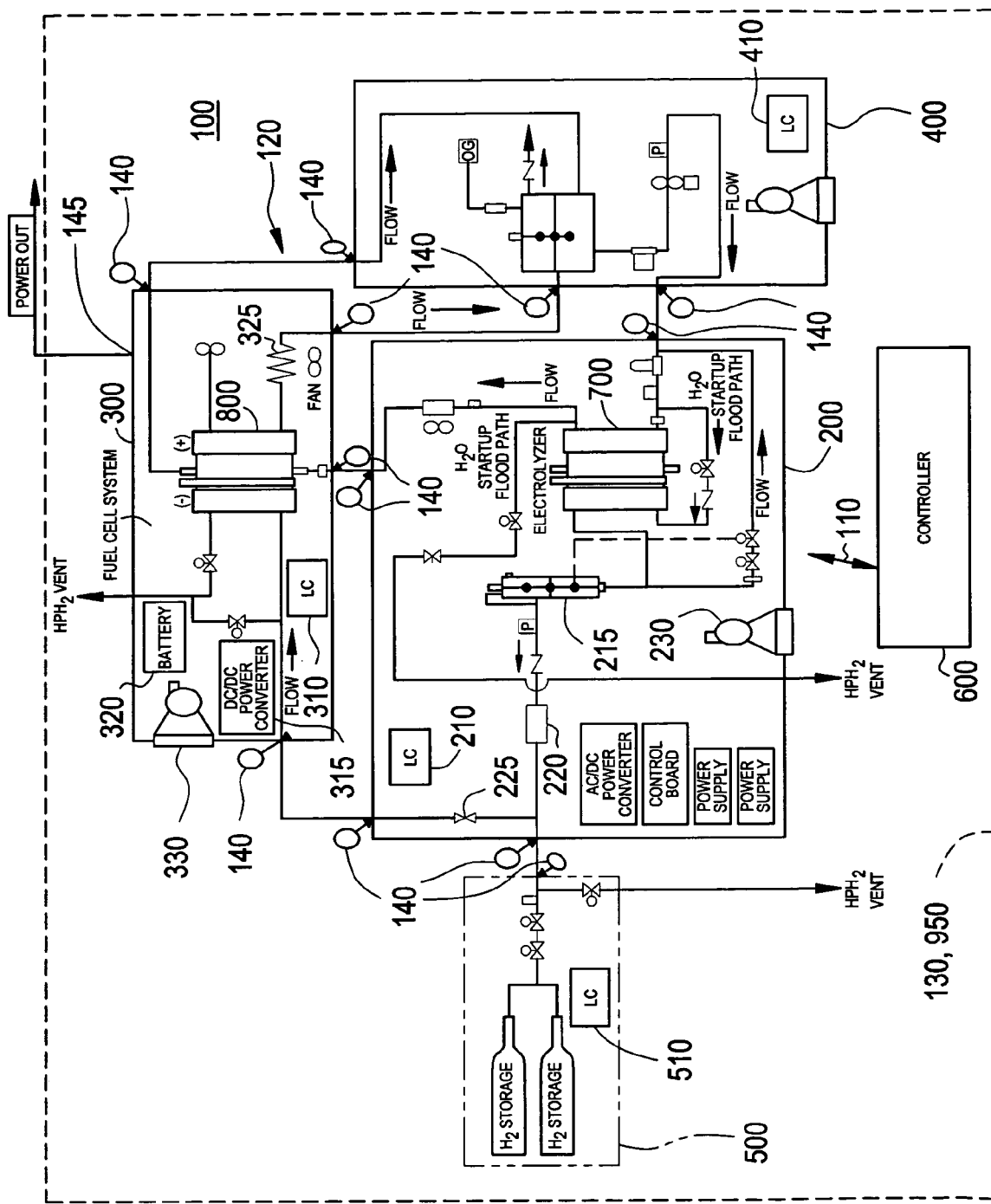
FIG. 1 depicts a schematic representation of a modular power system in accordance with an embodiment of the invention.

FIG. 1 is an exemplary embodiment of a regenerative electrochemical cell modular power system (MPS) 100 having an electrolyzer module (ELM) 200, a power module (PWM) 300, a water storage module (WSM) 400, a hydrogen storage module (HSM) 500, and a controller module (CTM) 600. CTM 600 is in operable communication with each power system module 200, 300, 400, 500 via communication bus 110 and local controllers (LCC) 210, 310, 410, 510. Power system modules 200, 300, 400, 500 are in fluid communication with each other via a piping network 120, which is in fluid communication with fluid connection ports 140, as will be discussed in more detail below. The fluid communication in piping network 120 may allow for hydrogen flow in either direction thereby providing more effective utilization of space within the confines of the MPS enclosure 130. In an embodiment, PWM 300 incorporates technology for creating electricity from hydrogen, such as a fuel cell, or a generator (e.g., driven by an internal combustion engine, hydropower, wind power, solar power, or the like). As discussed herein, where PWM 300 is configured as a fuel cell, it may also be referred to as a fuel cell module (FCM) 300. The electricity can provide power to a load (shown as POWER OUT in FIG. 1) that can be connected to PWM 300 at an electrical connection 145.

Figure 2:
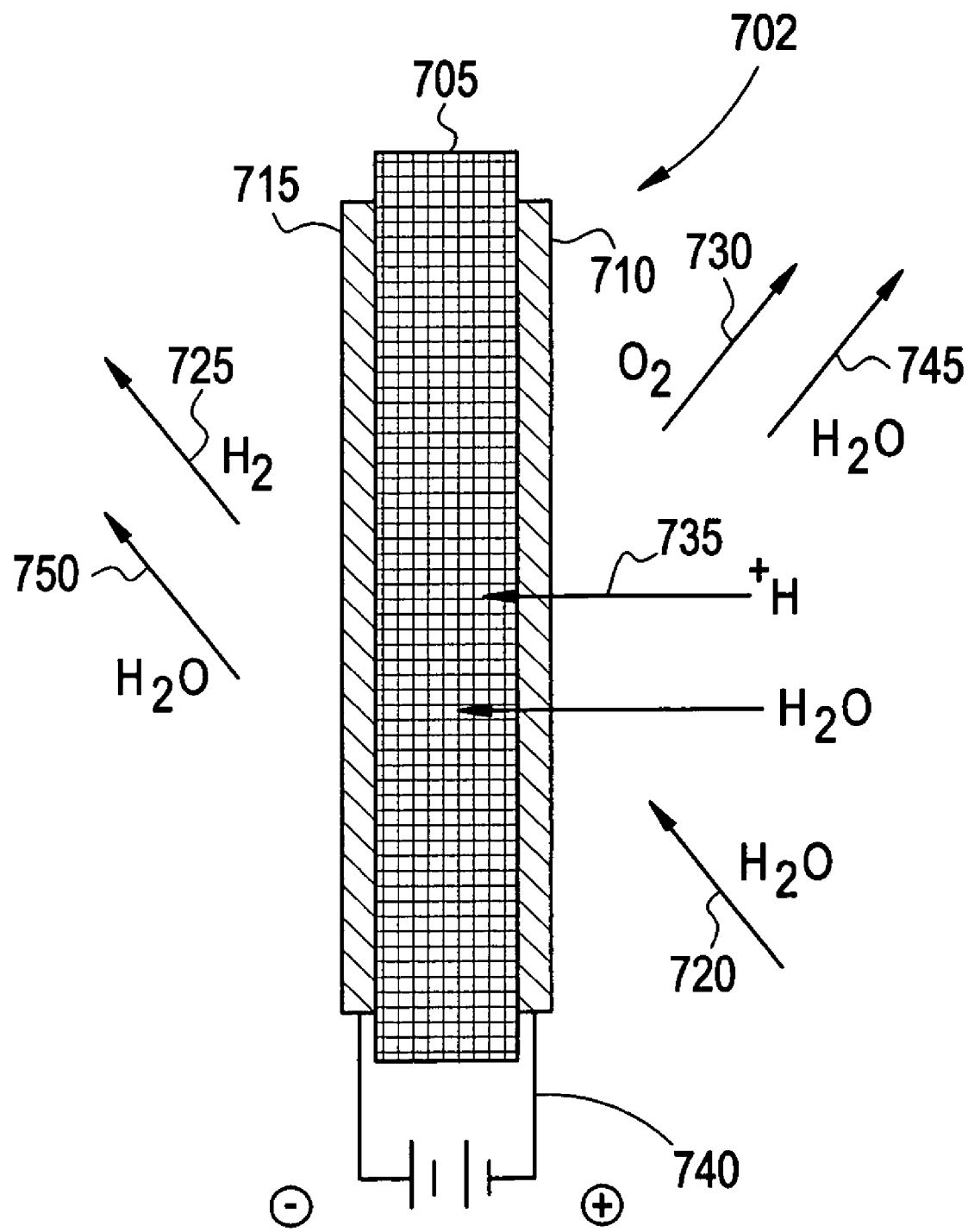
FIG. 2 depicts a schematic representation of an anode feed electrolysis cell for use in the system of FIG. 1.
Figure 3:
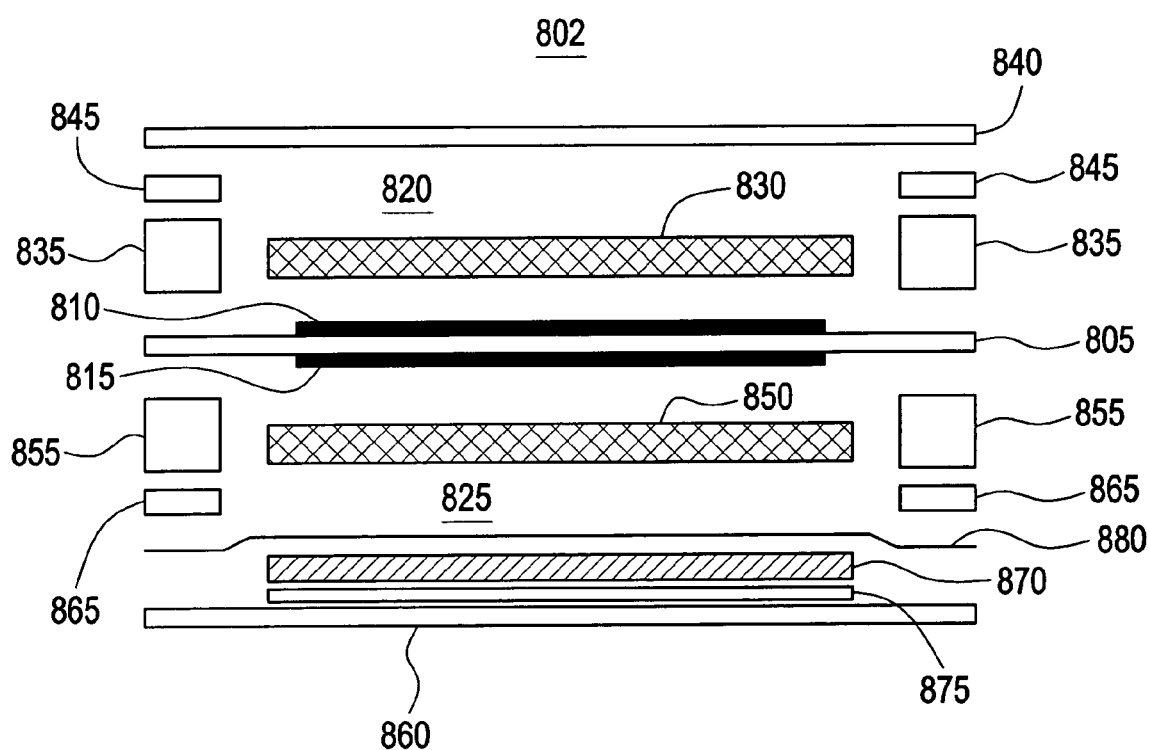
FIG. 3 depicts a schematic representation of a fuel cell system for use in the system of FIG. 1.

Referring now to FIGS. 2–3, electrochemical energy conversion cells employed in embodiments of ELM 200 and PWM 300 will be discussed. Although embodiments disclosed below are described in relation to an electrochemical power system comprising a proton exchange membrane electrochemical cell employing hydrogen, oxygen, and water, other types of electrochemical cells and/or electrolytes may be used, including, but not limited to, phosphoric acid and the like. Various reactants can also be used, including, but not limited to, hydrogen, bromine, oxygen, air, chlorine, and iodine. Upon the application of different reactants and/or different electrolytes, the flows and reactions change accordingly, as is commonly understood in relation to that particular type of electrochemical cell. Electrochemical cells may be configured as electrolysis cells or fuel cells, as will be discussed below.

Referring now to FIG. 2, an electrochemical cell configured as an anode fed electrolysis cell 702, which may be formed in a stack of one or more to form electrolyzer 700 and employed in an embodiment of ELM 200, is depicted in section view having a proton exchange membrane (PEM) 705 arranged between an oxygen electrode (anode) 710 and a hydrogen electrode (cathode) 715. Electrolysis cell 702 functions as a hydrogen generator by electrolytically decomposing process water 720 to produce hydrogen gas 725, oxygen gas 730. Process water 720 is fed into electrolysis cell 702 at anode 710 to form oxygen gas 730, electrons, and hydrogen ions (protons) 735. The chemical reaction is facilitated by the positive terminal of a power source 740 connected to anode 710 and the negative terminal of power source 740 connected to cathode 715. Power source 740 may be internal or external to ELM 200 and may include a battery or a connection to utility power. Oxygen gas 730 and a first portion 745 of the water are discharged from electrolysis cell 702, while protons 735 and a second portion 750 of the water migrate across PEM 705 to cathode 715. At cathode 715, hydrogen gas 725 is removed, generally through a gas delivery line (as illustrated in FIG. 1). The removed hydrogen gas 725 is usable in a myriad of different applications. Second portion 750 of water is also removed from cathode 715.

ELM 200 may include a number of individual electrolysis cells 702 arranged in a stack with process water 720 being directed through the cells via input and output conduits formed within the stack structure. Electrolysis cells 702 within the stack are sequentially arranged, with each cell 702 having a membrane-electrode assembly (MEA) defined by a proton exchange membrane 705 disposed between a cathode 715 and an anode 710. The cathode 715, anode 710, or both may be gas diffusion electrodes that facilitate gas diffusion to the proton exchange membrane 705. Each membrane-electrode assembly is in fluid communication with flow fields adjacent to the membrane electrode assembly and defined by structures configured to facilitate fluid movement and membrane hydration within each individual electrolysis cell 702.

The water 750 discharged from the cathode side 715 of the electrolysis cell 702, which is entrained with hydrogen gas, may be fed to a phase separator 215 (see FIG. 1) to separate the hydrogen gas 725 from the water 750, thereby increasing the hydrogen gas yield and the overall efficiency of electrolysis cell 702 in general. The removed hydrogen gas 725 may be fed either to a dryer 220 for removal of trace water, to HSM 500, which may be a cylinder, a tank, or a similar type of containment vessel, or directly to an application for use as a fuel, such as to FCM 300 (see FIG. 1).

Another type of water electrolysis cell (not shown) that utilizes the same configuration as is shown in FIG. 2 is a cathode feed cell. In the cathode feed cell, process water is fed on the side of the hydrogen electrode. A portion of the water migrates from the cathode across the membrane to the anode. A power source connected across the anode and the cathode facilitates a chemical reaction that generates hydrogen ions and oxygen gas. Excess process water exits the electrolysis cell at the cathode side without passing through the membrane.

A typical fuel cell system 800 (depicted in FIG. 1) also utilizes the same general MEA configuration as the electrochemical cell of FIG. 2, depicted in FIG. 2 as an electrolysis cell. In the fuel cell system 800 configuration, hydrogen gas 725 is introduced to hydrogen electrode 715 (the anode in the fuel cell system 800), while oxygen 730, or an oxygen-containing gas such as air, is introduced to oxygen electrode 710 (the cathode in the fuel cell system 800). The hydrogen gas for fuel cell operation can originate from a pure hydrogen source, a hydrocarbon, methanol, an electrolysis cell 702 such as that described above with reference to FIG. 2, or any other source that supplies hydrogen at a purity level suitable for fuel cell operation. The hydrogen gas 725 electrochemically reacts at the anode 715 to produce protons 735 and electrons, the electrons flow from the anode through an electrically connected external load, and the protons 735 migrate through the proton exchange membrane 705 to the cathode 710. At the cathode 710, the protons and electrons react with oxygen 730 to form product water 720.

In fuel cell system 800, the MEA of FIG. 2 may be configured as fuel cell 802, best seen by now referring to FIG. 3, which may be incorporated into a stack structure. In general, fuel cell system 800 includes one or more individual fuel cells 802 arranged in a stack, with the working fluids directed through the cells via input and output conduits formed within the stack structure. Fuel cell 802 comprises a MEA defined by a proton exchange membrane (PEM) 805 having a first electrode (anode) 810 and a second electrode (cathode) 815 disposed on opposing sides of PEM 805. Regions proximate to and bounded on a side by anode 810 and cathode 815, respectively, define flow fields 820, 825.

On the anode side of the MEA, a flow field support member 830 may be disposed adjacent to anode 810 to facilitate PEM 805 hydration and/or fluid movement to PEM 805. Flow field support member 830 is retained within flow field 820 by a frame 835 and a cell separator plate 840. A gasket 845 is optionally positioned between frame 835 and cell separator plate 840 to effectively seal flow field 820.

On the cathode side of the MEA, a flow field support member 850 may be disposed adjacent to cathode 815 to further facilitate PEM 805 hydration and/or fluid movement to PEM 805. The cathode side has a similar arrangement of frame 855, cell separator plate 860, and gasket 865. A pressure pad 870 may be disposed between flow field support member 850 and cell separator plate 860. Pressure pad 870 may be disposed on either or both sides of membrane 805 and may be positioned within either or both of flow fields 820, 825 in place of either or both flow field support members 830, 850. One or more pressure plates 875 may optionally be disposed adjacent to pressure pad 870 to distribute the pressure exerted on pressure pad 870 and increase the pressure within the cell environment. Flow field support member 850 and pressure pad 870 (as well as optional pressure plates 875) are retained within flow field 825 by frame 855 and cell separator plate 860. As discussed above, gasket 865 is optionally positioned between frame 855 and cell separator plate 860 to effectively seal flow field 825. The fuel cell 802 components, particularly frames 835, 855, cell separator plates 840, 860, and gaskets 845, 865, are formed with the suitable manifolds or other conduits to facilitate fluid communication through fuel cell 802.

Fuel cell 802 may be operated as either an "ex-situ" system, as shown, or as an "in-situ" system. In an ex-situ system pressure pad 870 is separated from the chemistry of fuel cell 802 by a pressure pad separator plate 880 disposed intermediate flow field 825 and pressure pad 870. Pressure pad separator plate 880 effectively prevents fluid communication between pressure pad 870 and the MEA. In an in-situ system, pressure pad 870 is preferably fabricated from materials that are compatible with the cell environment, and fuel cell 802 is operated without pressure pad separator plate 880 such that pressure pad 870 is maintained, for example, in fluid communication with the hydrogen environment of flow field 825.

Figure 4:
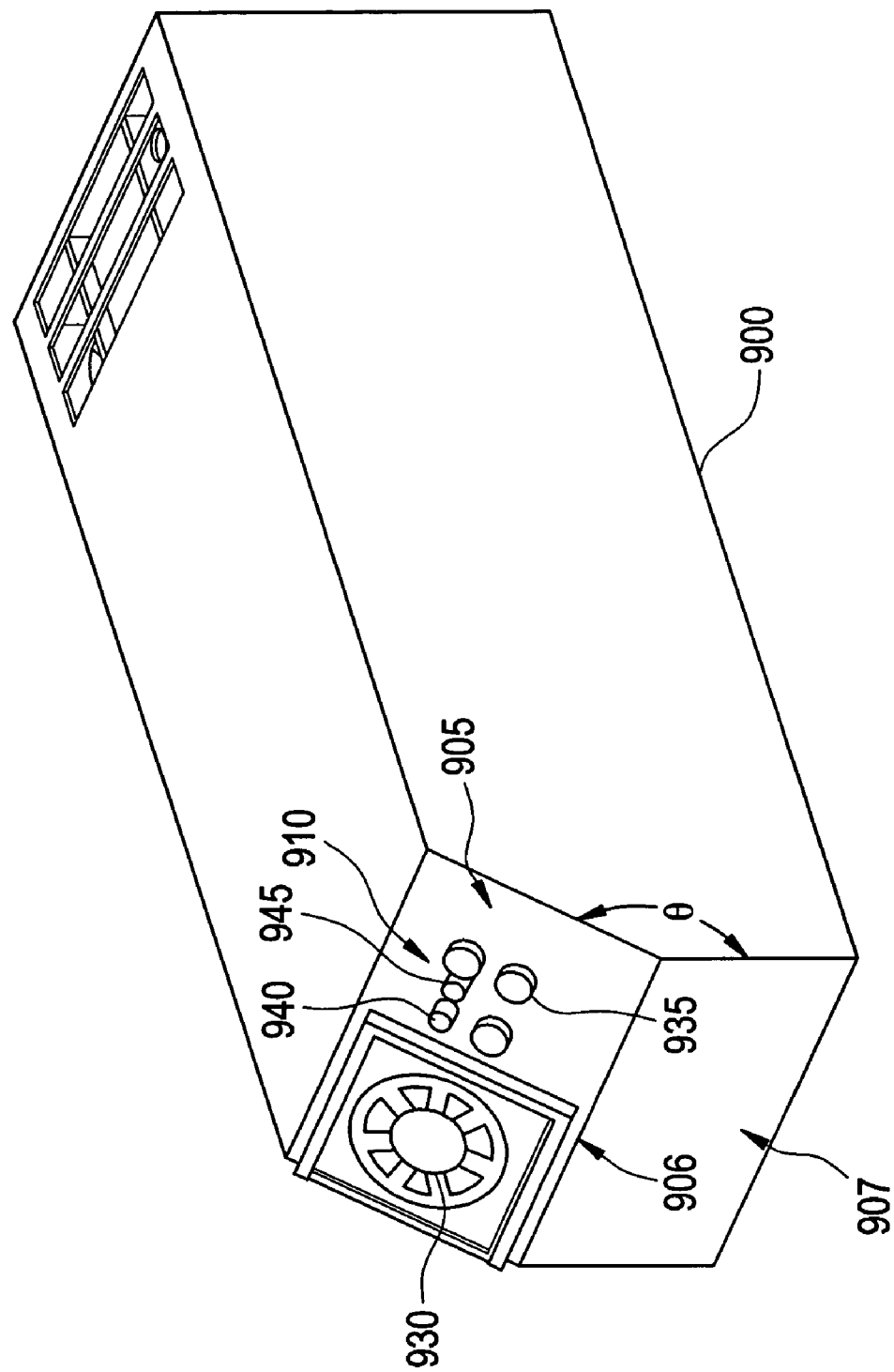
FIG. 4 depicts a perspective view of an exemplary module in an exemplary cabinet for use in the system of FIG. 1.
Figure 9:
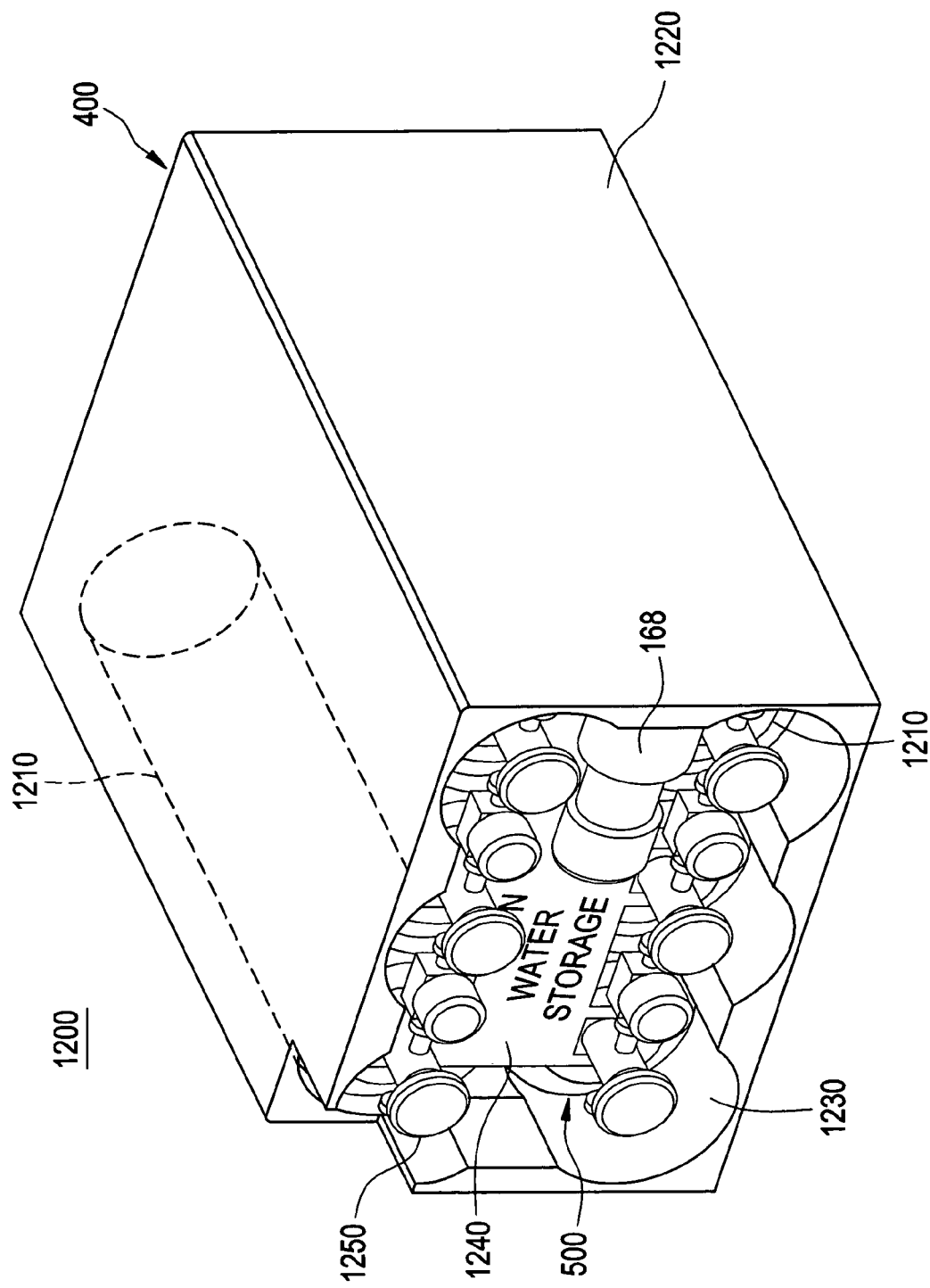
FIG. 9 depicts a perspective view of an integrated water and hydrogen storage module for use in the system of FIG. 1.
Figure 17:
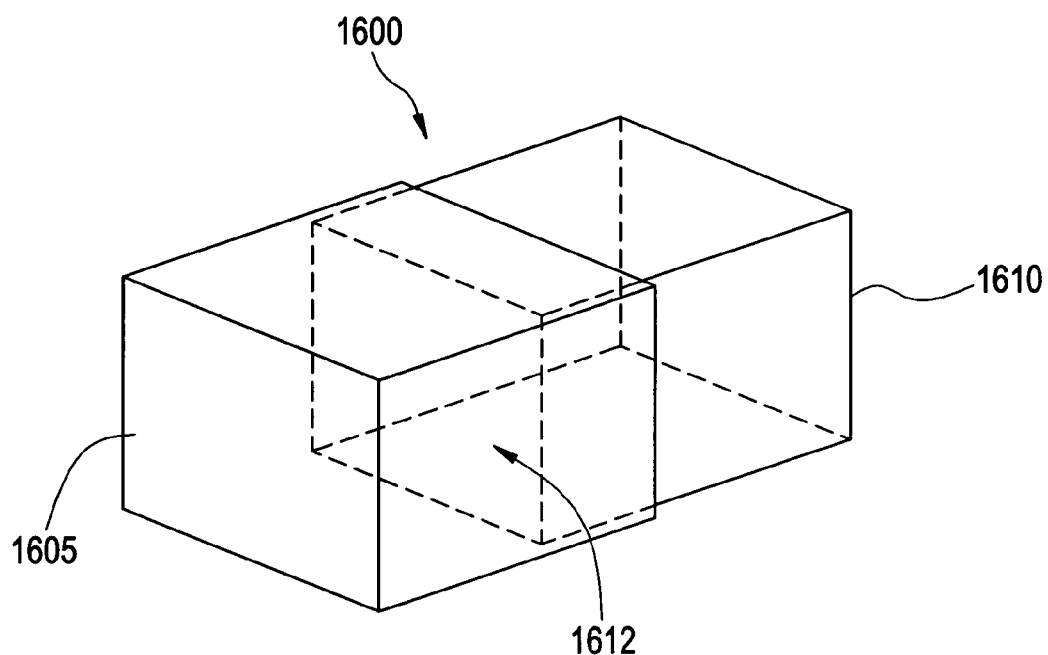
FIG. 17 depicts an exemplary expandable water storage module for use in the system of FIG. 1.
Figure 18:
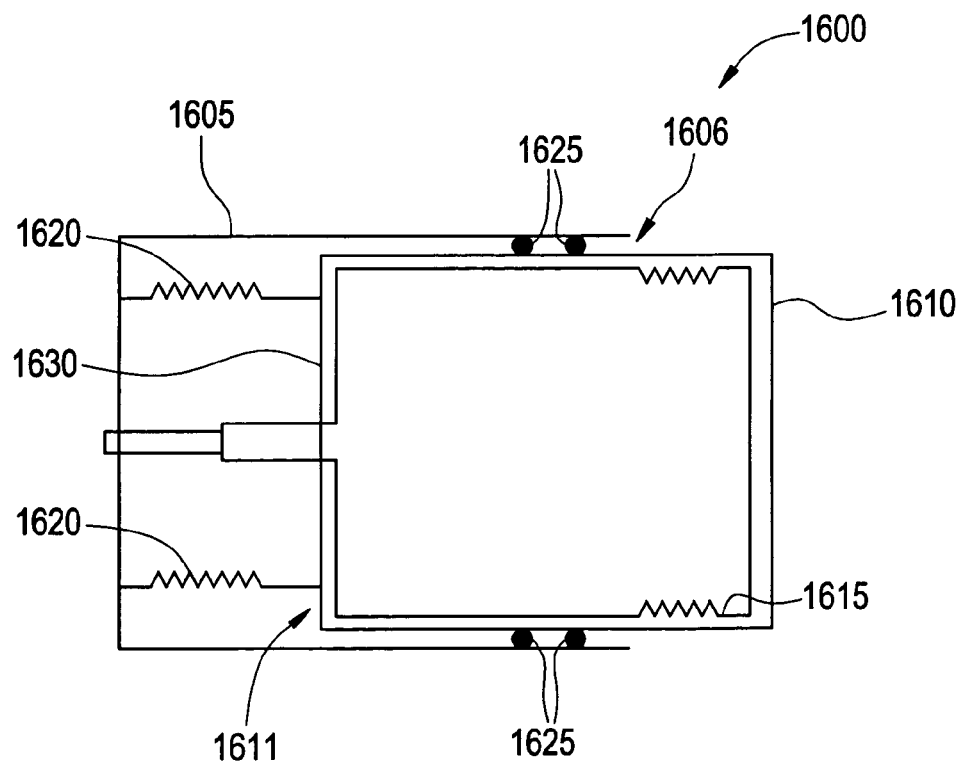
FIG. 18 depicts a cross sectional view of the expandable water storage module of FIG. 17.
Figure 19:
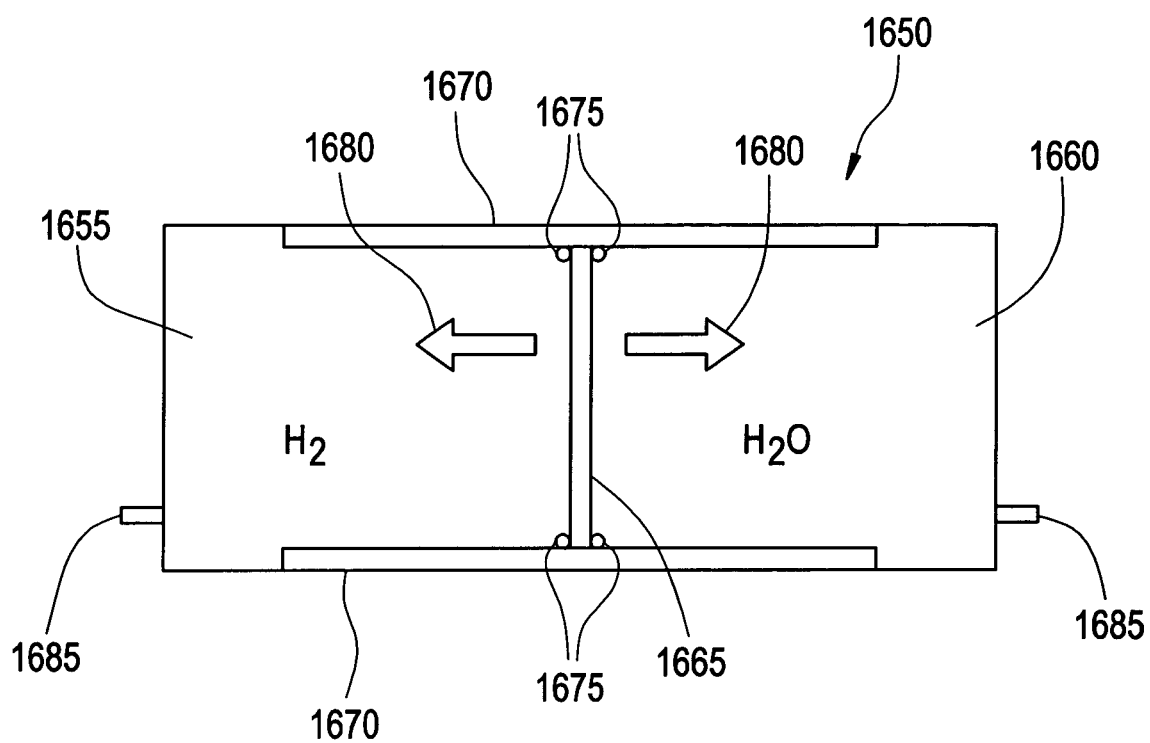
FIG. 19 depicts a cross sectional view of an exemplary hydrogen and water storage module having a movable divider for use in the system of FIG. 1.

Referring now to FIG. 4, the various modules 200, 300, 400, 500, and 600 (depicted in FIG. 1), and particularly ELM 200 and PWM 300, may each be disposed in a cabinet 900 having a sloped or recessed face 905 upon which may be disposed interface ports (set of connection ports, or alternatively, connection port set) 910 that facilitate the fluid and electrical (power and communications) connection of the modules and enable an operator to operate and monitor the modules via control signals. Each module, in its respective cabinet 900, may then be placed in an enclosure, rack or support 950, best seen by now referring to FIG. 5, where an enclosure arrangement provides for a weatherproof MPS 100, and a rack or support arrangement provides support for a compact MPS 100 having ease of access from at least one direction, such as the front or top for example, for maintenance and monitoring. In an effort to effectively utilize space in enclosure 950 of MPS 100, water storage modules 400, which can be configured to accommodate the irregular shape of a typical hydrogen storage vessel, may be integrated with hydrogen storage modules 500. Such an integral arrangement is depicted in FIG. 9 and discussed below. Furthermore, water storage modules 400 may be constructed to be adjustable, retractable or expandable, thereby enabling WSM 400 to response to a change in water volume, such as may occur during a change in temperature that causes the water to freeze and melt, or during the charging of water to the water storage module 400 from the FCM 300, or during the discharging of water from the water storage module 400 to the ELM 200. Such an adjustable, retractable or expandable WSM 400 is depicted in FIGS. 17–19 and discussed below.

Figure 5:
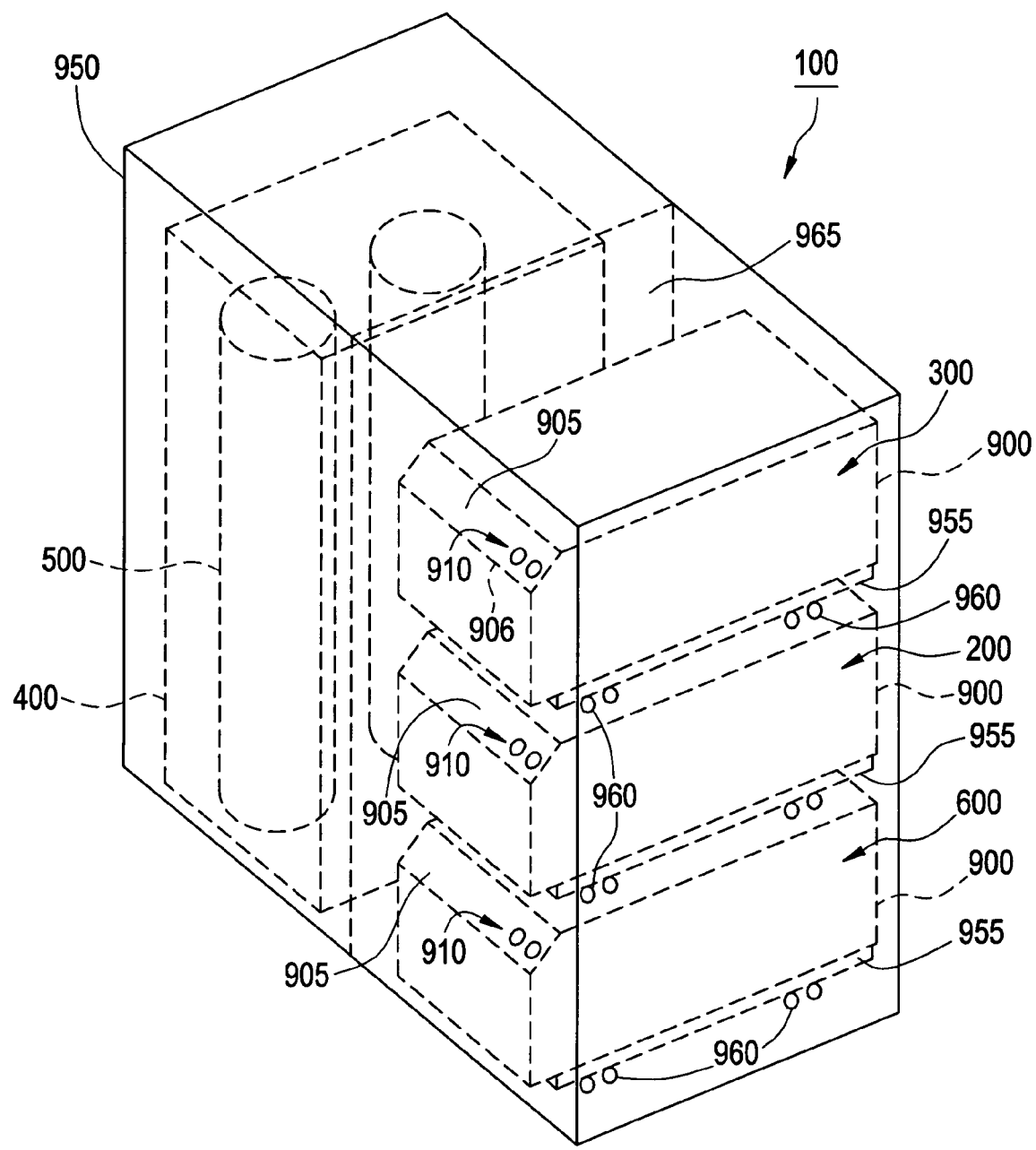
FIG. 5 depicts the system of FIG. 1 disposed in an exemplary enclosure.

Referring now to FIG. 5, an embodiment of MPS 100 is depicted having ELM 200 in a cabinet 900, FCM 300 in a cabinet 900, and controller 600 in a cabinet 900, with each cabinet 900 having a sloped face 905 that provides both front and top access during hook-up. In an exemplary embodiment, sloped face 905 has an edge 906 that is oriented horizontal to the ground that enclosure 950 is oriented to, however, edge 906 may be oriented other than horizontal as discussed below in reference to FIG. 7. As depicted, WSM 400 and HSM 500 are integrally arranged in MPS 100 in the manner discussed below with reference to FIG. 9, however, WSM 400 and HSM 500 may alternatively be configured in a cabinet 900 and installed as discussed herein. Each cabinet 900 may be disposed on sliding drawers 955, which may be disposed on rollers, tracks or the like, 960 to facilitate their removal and insertion. While it is preferable to provide MPS 100 as a series of contained modules, it may be necessary, depending on the size and rating of the modular components, to locate some of the modules external to enclosure 950. In either arrangement, MPS 100 provides an operator with the flexibility of being able to simply add "plug-in" modules as needed in order to increase system capacity. For example, an increase in system capacity may be accomplished by adding PWMs 300 in series to establish a greater voltage output, or by adding PWMs 300 in parallel to establish a greater current output; in both cases, this increases the power output. Modular cabinets 900 can be separately removed, serviced, upgraded, and the like and then plugged back into the system.

The general operation of MPS 100 involves the delivery of water from WSM 400 to ELM 200, where the water is electrolyzed to form hydrogen and oxygen gas. The hydrogen gas is dispensed from ELM 200 to HSM 500, from which it is periodically retrieved and dispensed to FCM 300. Once received in FCM 300, the hydrogen gas is reacted with oxygen to produce electrons and water. Power is distributed from MPS 100 by directing the electrons through an attached load (not shown). Excess water is returned to WSM 400. The operation and control of MPS 100 and the distribution of power is governed by controller 600 and programmed software.

An exemplary MPS 100, depicted in FIG. 5, may be used to provide backup power in telecommunications applications and has dimensions of approximately 1.2 meters (m) in height, 0.74 m in width, and 0.81 m in depth. In this configuration, ELM 200, PWM 300, and controller 600 are disposed within enclosure 950 on sliding drawers 955 that provide support for and access to modules 200, 300, 600. A second compartment in enclosure 950 provides space for HSM 500 (two storage cylinders for example). A divider wall 965 separates modules 200, 300, 600 from HSM 500 to provide isolation of HSM 500 from the electronics of controller 600. To fit into enclosure 950, modules 200, 300, 600 each have an outer dimension of 0.35 m in height, 0.30 m in width, and 0.67 m in depth. Since this exemplary system is intended to provide only 1 kilowatt-hour (kW-hr) of power, the water stored in phase separator 215 is sufficient to generate the necessary hydrogen at ELM 200, thereby removing the need for a separate WSM 400. Replenishment of water lost during the operation of ELM 200 or FCM 300 may be accomplished by refilling the water supply via a line from an external water source (not shown) to a port 910 on the sloped face 905 of cabinet 900 of ELM 200.

The sloped faces 905 on cabinets 900 of modules 200, 300, 600 of MPS 100 provide accessibility to connection ports 910 from two directions, and depending on the clearance between connection ports 910 and the interior surfaces of enclosure 950, connections may be made between sloped faces 905 of one module to the next. The ability to interconnect the various modules from the front facilitates connectability of the modules after they have been racked in. Eliminating the interconnection of the modules from the side, top or bottom, reduces maintenance and system downtime.

Figure 6:
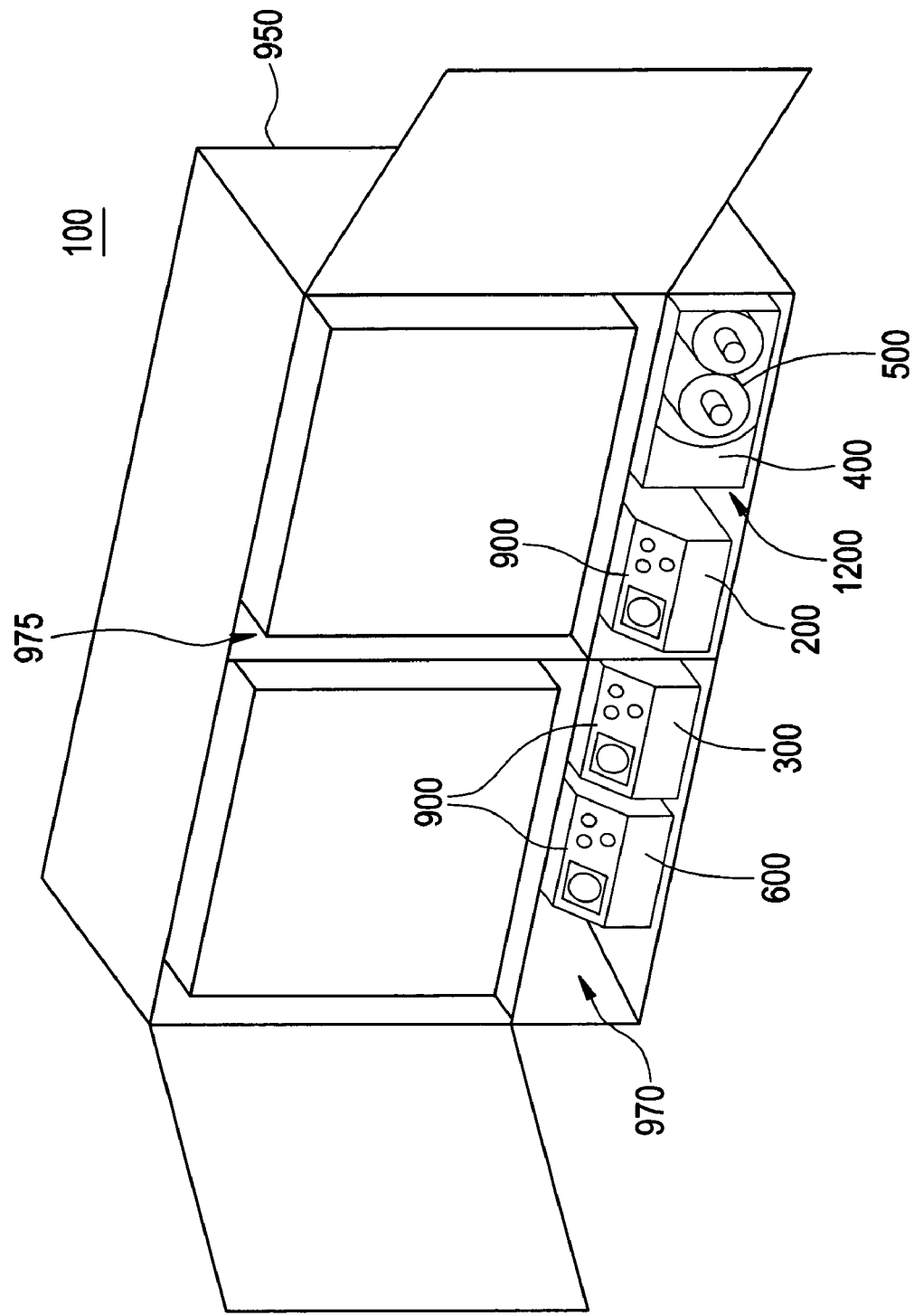
FIG. 6 depicts an alternative enclosure arrangement to that of FIG. 5.
Figure 7:
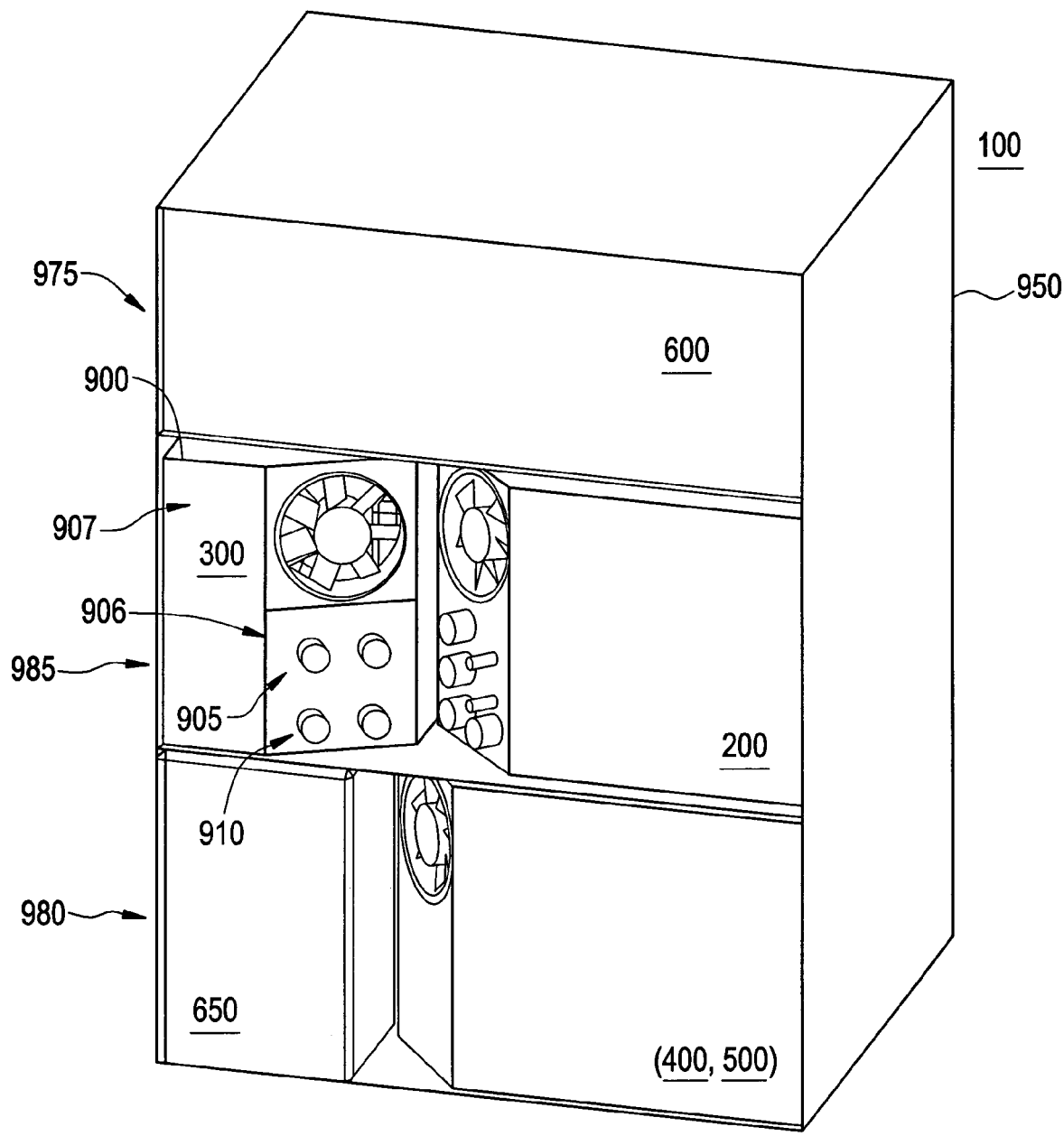
FIG. 7 depicts another alternative enclosure arrangement to that of FIG. 5.

Alternative embodiments of MPS 100 in enclosure 950 are depicted in FIGS. 6 and 7. FIG. 6 depicts an exemplary enclosure 950 having a bottom compartment 970 and a top compartment 975. Bottom compartment 970 provides a shelf for modules 200, 300, 400, 500, and 600, with WSM 400 and HSM 500 being integrally arranged as discussed below in reference to FIG. 9. Top compartment 975 provides space for auxiliary power supplies, input/output ports, and customer operational devices (not shown).

FIG. 7 depicts an alternative enclosure 950 having a first bottom compartment 980 and a second bottom compartment 985 for housing modules 200, 300, 400 and 500, where embodiments of modules 200 and 300 may be in cabinets 900, and a top compartment 975 for housing controller 600. Here, cabinet 900 has edge 906 of sloped face 905 oriented vertical to the ground that enclosure 950 is oriented to, thereby providing front and top access (with drawer extracted) to interface ports 910 on each of the modules. Top compartment 975 and bottom compartment at an auxiliary module 650 may also provide space for auxiliary power supplies, input/output ports, and customer operational devices (not shown). Sloped face 905 on one side of vertical edge 906 defines a second face 907 that may or may not be sloped itself. The angle at which sloped face 905 and second face 907 are joined may be any angle that enables connections to be made with interface ports 910. While only two faces, sloped face 905 and second face 907, are depicted, it will be appreciated that any number and combination of faces may be angled with respect to adjacently-positioned faces.

Figure 8:
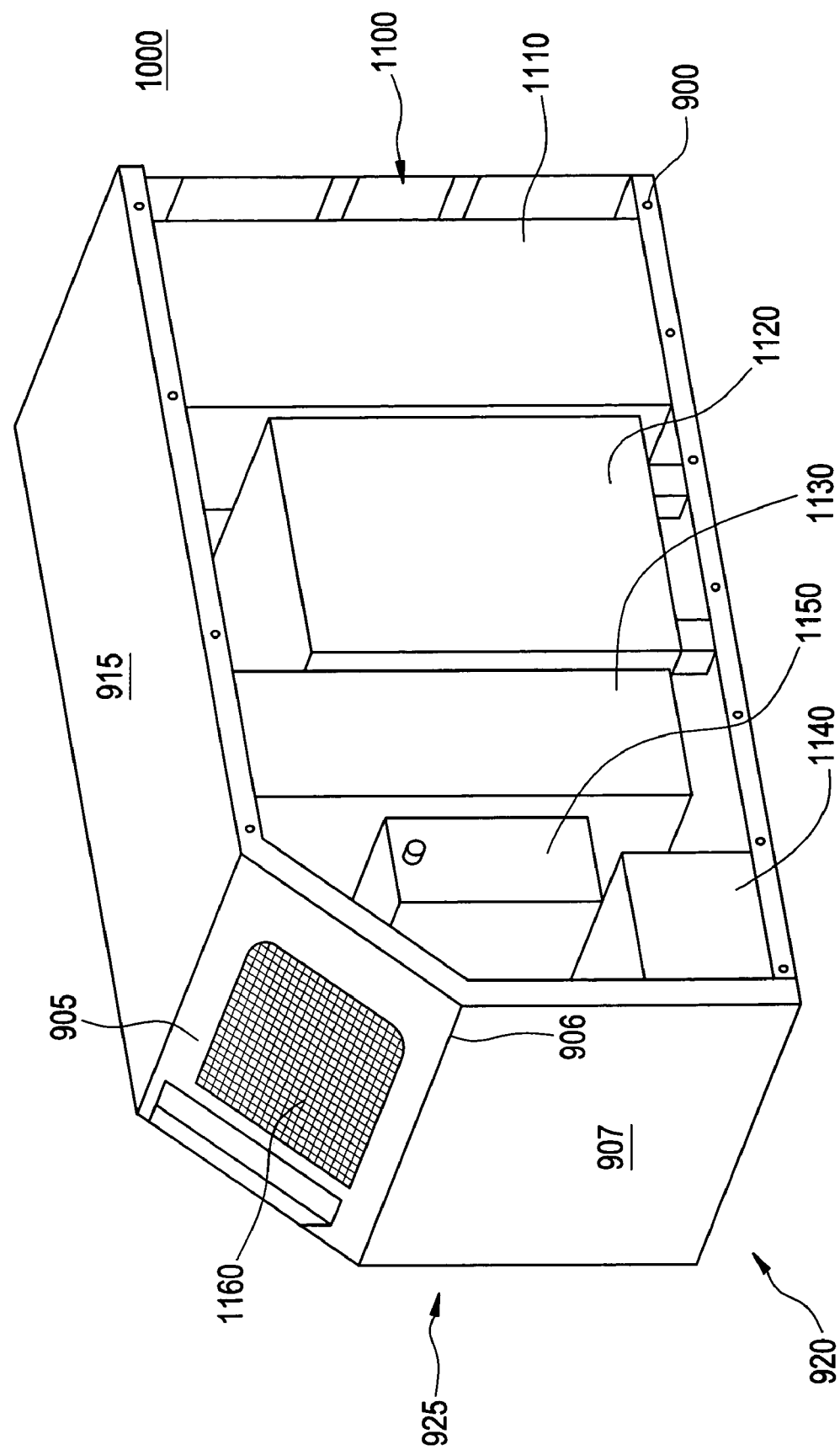
FIG. 8 depicts a general exemplary module similar to that of FIG. 4.

Referring now to FIG. 8, an exemplary module 1000 is depicted having a cabinet 900 and internal components, depicted generally as 1100. Module 1000 may be an ELM 200, a PWM 300, a WSM 400, a HSM 500, or a combination thereof such as an integral water and hydrogen storage module as discussed below in reference to FIG. 9. As depicted in FIGS. 1 and 5–7, combinations of modules may be configured for use in an electrochemical power system to provide a MPS 100, where each module 1000 is in operable communication with each other, as illustrated in FIG. 1 and discussed in detail above. In an exemplary embodiment where module 1000 functions as an ELM 200, block 1110 may represent a water tank with phase separators 215, block 1120 may represent an electrolyzer 700, block 1130 may represent a power supply 740, block 1140 may represent a pressure regulator 225, block 1150 may represent a filter or dryer 220, and grill 1160 may represent a vent for ventilation fan 230. Other components of ELM 200 depicted generally in FIG. 1 may also be included in cabinet 900 of module 1000 but are hidden from view in FIG. 8. In an exemplary embodiment where module 1000 functions as a FCM 300, block 1110 may represent a bridge power unit 315, block 1120 may represent a fuel cell system 800, block 1130 may represent a power supply 320, block 1140 may represent a phase separator 325, block 1150 may represent a local controller 310, and grill 1160 may represent a vent for ventilation fan 330. Other components of FCM 300 depicted generally in FIG. 1 may also be included in cabinet 900 of module 1000 but are hidden from view in FIG. 8. Other modules such as WSM 400 and HSM 500 may be contained in cabinet 900 of module 1000 with the various internal components 1100 representing the system components relating to the particular function of the module. In general, cabinet 900 is an enclosure defined by panels arranged to form a polyhedral structure. The panels define surfaces including a top 915, a bottom 920, a left side 925, a right side (removed to show internal components), a back (not shown), a sloped face 905, and a second face 907. Sloped face 905 and second face 907 are delineated by edge 906, where either sloped face 905, second face 907, or both, are angled with respect to top 915 or bottom 920. In an embodiment, a portion of each surface is perpendicular relative to its adjacently positioned surface. In an embodiment, interface ports (not depicted in FIG. 8 but depicted at 910 in FIG. 4) are disposed on the sloped face 905 to facilitate the interaction of module 1000 with other modules, and the operational control of module 1000. The interface ports 910 may include, but are not limited to, a ventilation fan 230, 330 (see FIG. 1) and 930 (see FIG. 4), fluid connection ports 140 (see FIG. 1) and 935 (see FIG. 4), electrical connections 145 (see FIG. 1) and 940 (see FIG. 4), and communications wiring ports depicted generally as communication bus 110 (see FIG. 1) and 945 (see FIG. 4).

In an embodiment, sloped face 905 and second face 907 are formed from a single sheet having edge 906, or may be formed from separate sheets fastened to a structural framework of cabinet 900. Sloped face 905 may be angled away from second face 907 at an angle theta, thereby defining a horizontal edge 906 as depicted in FIGS. 4, 5, 6, and 8, or a vertical edge 906 as depicted in FIG. 7. Angle theta may be any angle that enables connections to be made with interface ports 910 such that sufficient clearance is established between interface ports 910 and the interior surfaces of enclosure 950, which cabinet 900 is mounted in. The specific dimensions of the module 1000 are dependent upon the size of the enclosure 950 in which module 1000 will be employed, and the amount of power that modules 1000 should produce, as discussed above.

Referring now to FIG. 9, an exemplary water and hydrogen storage module (WHSM) 1200 is depicted as being an integrally arranged WSM 400 and HSM 500, which may be used in MPS 100. WSM 400 serves as the water source for ELM 200 while HSM 500, having six hydrogen storage vessels 1210 as shown (for clarity, only one vessel 1210 is shown in dotted line format within water tank 1220 discussed below), receives generated hydrogen from the ELM 200 and subsequently dispenses the hydrogen to FCM 300.

In an embodiment, WSM 400 includes a tank 1220 having a pocket 1230 formed therein and a retaining connecting member 1240 disposed at the mouth of pocket 1230. Pocket 1230 is configured and dimensioned to receive, retain, and substantially correspond to the shape and size of hydrogen storage vessel 1210 (or a plurality of hydrogen storage vessels 1210). In an embodiment, hydrogen storage vessels 1210 are cylindrical in shape and include connection ports 1250 at one end to facilitate fluid communication with both ELM 200 and FCM 300. Since water assumes the shape of its container, an embodiment of WSM 400 is configured with inner surfaces that define pockets 1230, thereby accommodating hydrogen storage vessels 1210 in such a manner that inner surface of pockets 1230 conform to the outer surface of hydrogen storage vessels 1210.

Retaining member 1240 disposed at the mouth of pocket 1230 retains the hydrogen storage vessels 1210 within pocket 1230, and in the absence of operator intervention, prevents hydrogen storage vessels 1210 from inadvertently departing from pocket 1230. In an embodiment, retaining member 1240 includes a member (a plate for example) that fits over the mouth of pocket 1230 and includes cut out portions or other openings that facilitate the connection of connection ports 1250 with ELM 200 and FCM 300. In another exemplary embodiment, retaining member 1240 may include clips (not shown) mounted at the mouth of pockets 1230 that engage hydrogen storage vessels 1210 and prevent their removal in the absence of operator intervention.

WHSM 1200 provides for the efficient use of limited space within enclosure 950 of MPS 100 by utilizing the space within enclosure 950 that may go unused as a result of the cylindrical configuration of hydrogen storage vessels 1210. Since liquids (water for example) assume the shape of their containers, configuring a container to correspond to an irregularly-shaped object at one surface and to correspond to either a regularly-shaped object or another irregularly-shaped object at an opposing surface, effectively utilizes space that may have gone unused. In an exemplary embodiment of WHSM 1200, as depicted in FIG. 9, the retaining of hydrogen storage vessels 1210 within pockets 1230 of water tank 1220 further provides shock absorbing capability to hydrogen storage vessels 1210, thereby protecting the hydrogen in the event of an impact to MPS 100.

Figure 10:
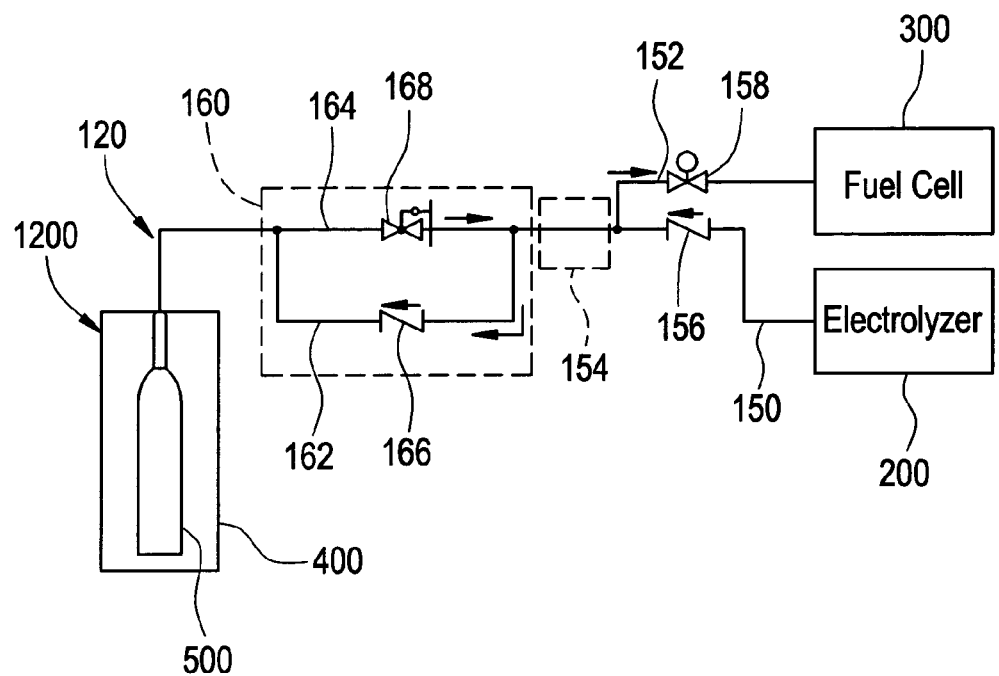
FIG. 10 depicts a schematic diagram of an exemplary piping network for use in the system of FIG. 1.

Referring now to FIG. 10, a portion of piping network 120 for MPS 100, depicted in FIG. 1, provides fluid communication between ELM 200, WHSM 1200, and FCM 300. Piping network 120 enables WHSM 1200 to be charged to elevated pressures, and discharged through the same lines at a substantially lower pressure. In an embodiment, WHSM 1200 includes hydrogen storage vessel 1210 integrated into the water storage tank 1220 as described above. Alternately, WHSM 1200 may be a stand-alone cylinder, as depicted in FIG. 10. Pressures at which the hydrogen at WHSM 1200 may be charged are typically up to about 20,000 pounds per square inch (psi), with about 100 psi to about 400 psi preferred in some applications, and about 2,000 psi to about 10,000 psi preferred in other applications. Additionally, vessels 1210 may contain metal hydrides that absorb and release hydrogen.

The various lines of piping network 120 may be arranged such that a charging line 150 from ELM 200 and a discharging line 152 to FCM 300 are in fluid communication with each other at a node 154. Charging line 150 includes a check valve 156 that prevents backflow of hydrogen gas to ELM 200. Discharging line 152 includes an actuated valve 158 that is closed except during a discharging operation. In an embodiment and during a charging operation, fluid communication between ELM 200 and FCM 300 is prevented by actuated valve 158, which has its inlet side exposed to the charging pressure (about 2,000 psi for example).

Fluid communication may be maintained between node 154 and HSM 500 via a piping manifold 160. Piping manifold 160 includes an inlet line 162 and an outlet line 164. Inlet line 162 and outlet line 164 may be disposed in a parallel configuration with respect to each other, as depicted in FIG. 10. Inlet line 162, which provides for the flow of hydrogen between node 154 and HSM 500 during a charging operation (and thus provides fluid communication between ELM 200 and HSM 500), includes a check valve 166 to prevent the backflow of hydrogen gas to node 154. Outlet line 164, which provides for the flow of hydrogen between HSM 500 and node 154 during a discharging operation (and thus provides fluid communication between HSM 500 and FCM 300), includes a pressure regulating valve 168 to regulate (step down for example) the flow of hydrogen gas to FCM 300.

Node 154, which provides for the fluid communication between inlet line 162 and outlet line 164, and between charging line 150 and discharging line 152, allows the flow of hydrogen gas to be maintained in either direction. Depending upon the physical dimensions of the power system into which piping network 120 is incorporated, distances between ELM 200, FCM 300, and HSM 500 may be significant. Thus, node 154 may include a significant length of piping or an elongated manifold to effect the fluid communication between HSM 500, FCM 300 and ELM 200.

In the embodiment depicted in FIG. 10, piping network 120 provides fluid communication between the various modules of MPS 100, charging of HSM 500 to high pressures, and regulated discharging of HSM 500 at lower pressures, through shared lines, thereby eliminating the need for maintaining two separate lines in which one is utilized for charging of HSM 500 and the other is utilized for discharging of HSM 500. Use of one line for both charging and discharging operations allows for reduced downtime during system maintenance. Furthermore, as a result of less piping being used in a shared line system, a significant space and cost savings may be realized.

Figure 11:
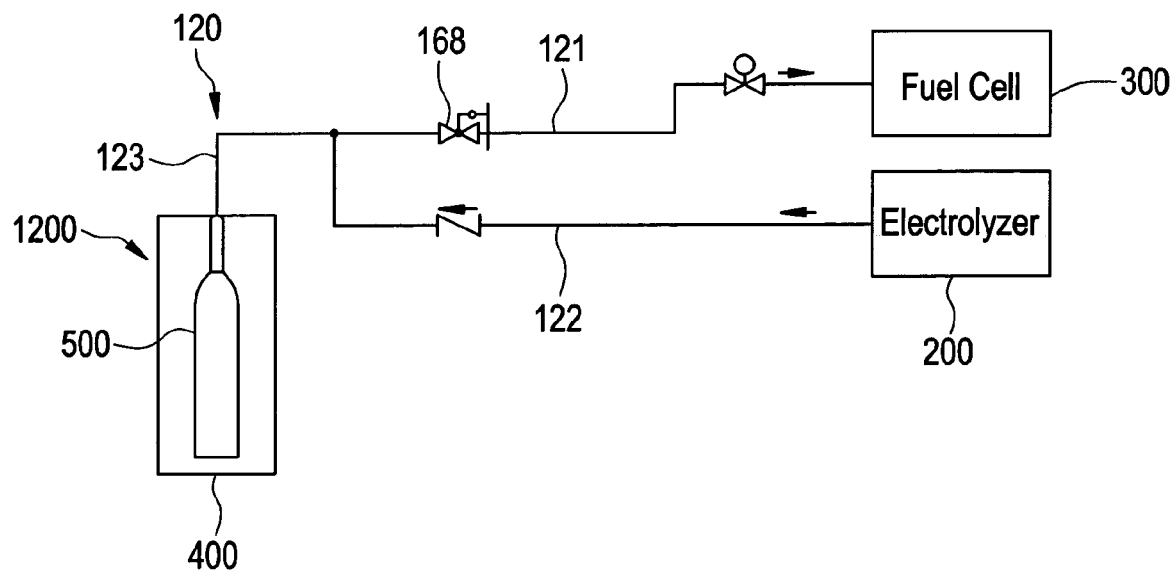
FIG. 11 depicts a schematic diagram of an alternative piping network to that of FIG. 10.

Alternately, and referring now to FIG. 11, fluid communication may be maintained between WHSM 1200, FCM 300 and ELM 200 via a first line 121 extending between WHSM 1200 and FCM 300, and a second line 122 extending between WHSM 1200 and ELM 200. A third line 123 may connect WHSM 1200 to first and second lines 121, 122, or first and second lines 121, 122 may connect separately to WHSM 1200. In an embodiment, first line 121 carries low pressure hydrogen gas, while second and third (where present) lines 122, 123, carry high pressure hydrogen gas.

Referring now to FIGS. 12–16, exemplary alternative embodiments to modular cabinet 900 are shown with reference to numerals 1300, 1400, and 1500. Cabinets 1300, 1400, and 1500 (collectively referred to as alternative cabinets) may be an ELM 200, a FCM 300, a controller module 600, and the like.

Figure 12:
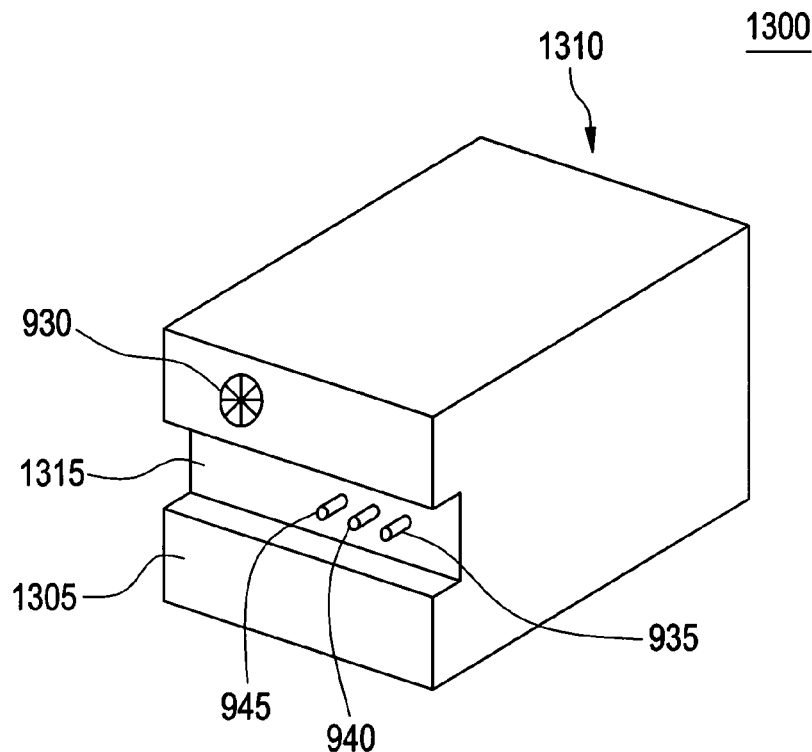
FIGS. 12 and 13 depict perspective views of alternative modules to that of FIG. 4.

In FIG. 12, alternative modular cabinet 1300 includes a face 1305 disposed in a parallel planar relationship with an opposingly-positioned back panel 1310. Face 1305 includes a recessed area 1315 at which fluid connection ports 935, electrical connectors 940, and communication wiring ports 945 are disposed. Recessed area 1315 is recessed a sufficient amount to enable connections to be made to ports 935, 945 and connectors 940 without interference with an adjacent surface in enclosure 950. Recessed area 1315 is further dimensioned and configured to facilitate the receipt and extension of communication devices (connecting hardware including for example, wires, wiring harnesses, piping, tubing, and the like) (not shown) between connection ports 935, electrical connectors 940, and/or communication wiring ports 945, with the proper corresponding ports and/or connectors of an adjacently-positioned cabinet (generally depicted as adjacently-positioned cabinets 900 in FIG. 6). Ventilation fan 930 may be disposed on face 1305, as shown, or it may be disposed within recessed area 1315.

Figure 13:
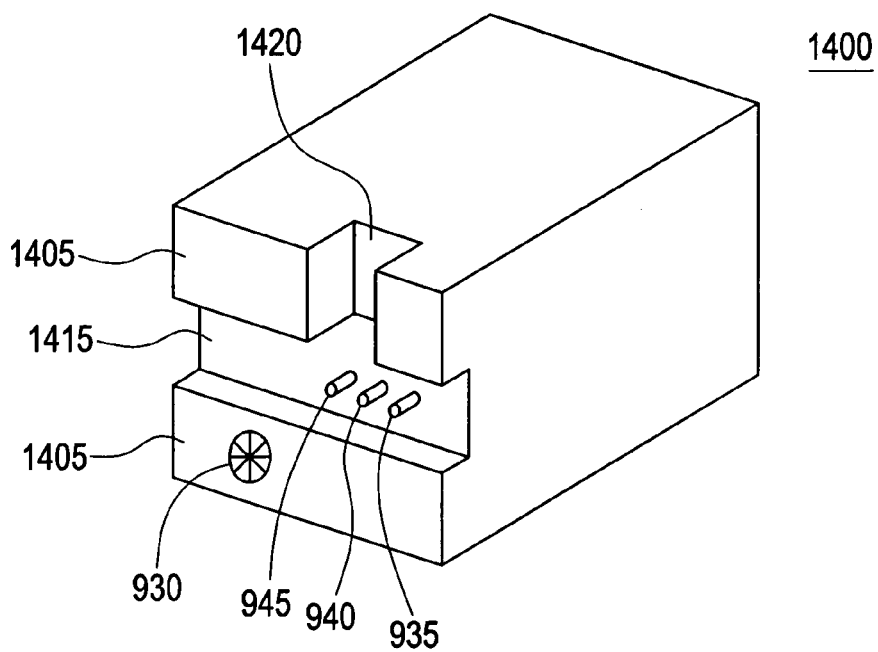

In FIG. 13, alternative modular cabinet 1400 includes a face 1405 having a horizontally-oriented recessed area (channel) 1415 and a vertically-oriented recessed area (channel) 1420, which facilitate the connection of fluid connection ports 935, electrical connectors 940, and communication wiring ports 945, with corresponding ports and/or connectors of an adjacently-positioned cabinet (generally depicted as adjacently-positioned cabinets 900 in FIGS. 5 and 6) disposed above or at the side of cabinet 1400. Recessed areas 1415, 1420 are dimensioned to enable connections to be made to ports 935, 945 and connectors 940, without interference. As with cabinet 1300 of FIG. 12, ventilation fan 930 may be disposed on face 1405, as shown, or it may be disposed within horizontally-oriented recessed area 1415 or vertically-oriented recessed area 1420.

Figure 14:
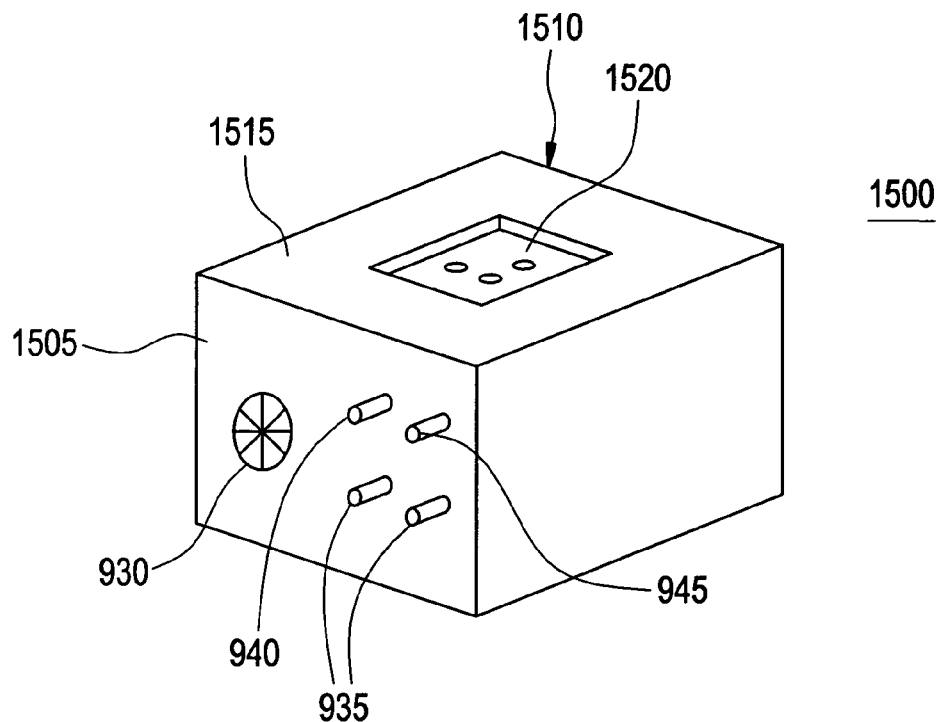
FIGS. 14 and 15 depict perspective views of an alternative module to that of FIG. 4 having a plug-in feature.
Figure 15:
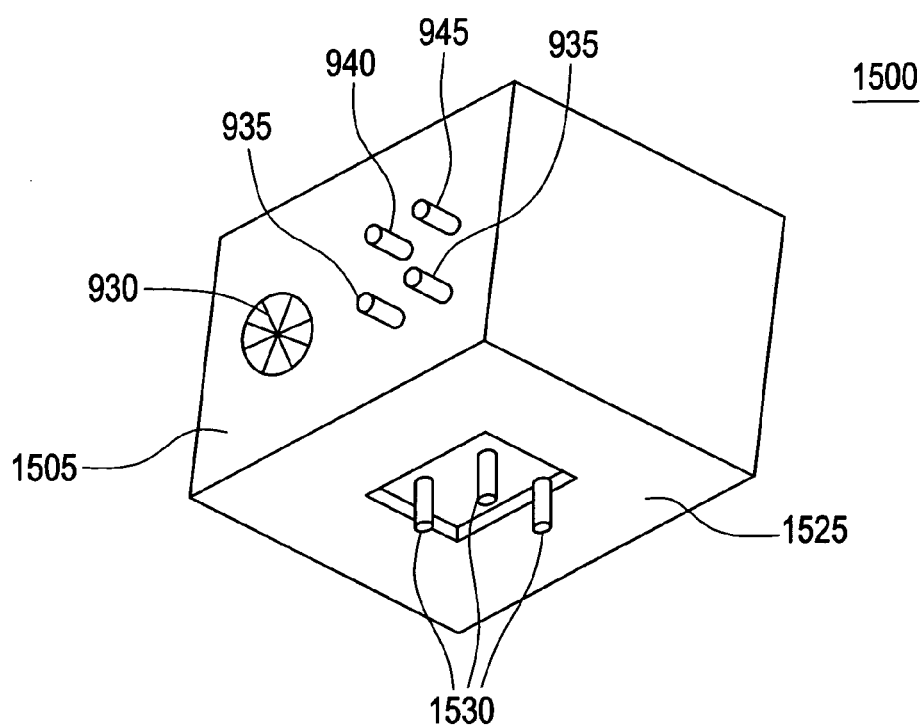
Figure 16:
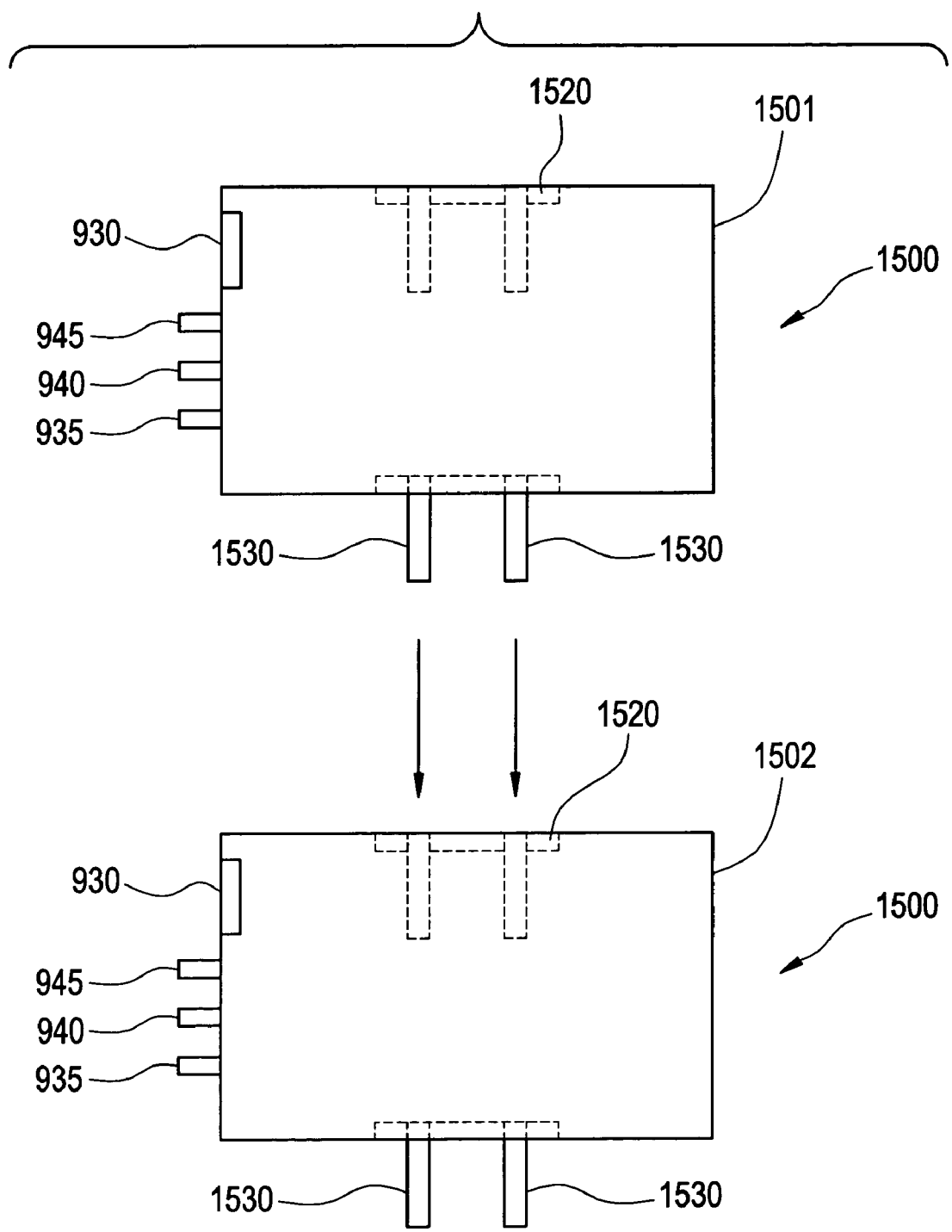
FIG. 16 depicts an arrangement for connecting the alternative module depicted in FIGS. 14 and 15.

In FIGS. 14–16, alternative modular cabinet 1500 includes a face 1505 arranged parallel to a back surface 1510, or it may include a sloped face 905 as described above with reference to FIG. 4. A top surface 1515 includes a plug receiving port 1520 (a series of holes such as in a socket for example), and a bottom surface 1525 includes prongs 1530. Prongs 1530 and plug receiving port 1520 are examples of, but are not limited to, first and second connectors, respectively, that may be used to connect one module to another. As depicted in FIG. 16, prongs 1530 of a first modular cabinet 1501 may be received in plug receiving port 1520 of an adjacently-positioned second modular cabinet 1502 to enable electrical and/or fluid communication to be maintained between the modular cabinets (generally depicted as adjacently-positioned cabinets 900 in FIG. 5). Additional modular cabinets 1500 may be employed as needed, or as the output demands of MPS 100 changes. For example, an MPS 100 having an original power output demand of 1-kilowatthour may be upgraded to a 2-kilowatthour MPS 100 by plugging in a second ELM 200 having cabinet 1500 into a first ELM 200 having cabinet 1500, and by plugging in a second FCM 300 having cabinet 1500 into a first FCM 300 having cabinet 1500. Plug receiving port 1520 and prongs 1530 are sealed when not used. Fluid connection ports 935, electrical connectors 940, communication wiring ports 945, and/or ventilation fan 930 may be disposed at face 1505 of each modular cabinet 1500.

Referring now to FIGS. 17 and 18, an alternative embodiment to WSM 400 of MPS 100 is depicted as an expandable water storage module (EWSM) 1600. In response to spatial constraints being imposed on MPS 100, EWSM 1600 may be configured to change its volume in response to changes in water volume, thereby more efficiently utilizing space in enclosure 950. In particular, EWSM 1600 may be configured to expand in response to the intake of water, and to contract in response to the discharge of water. Furthermore, under varied environmental conditions that lead to the freezing or melting of the water fed to ELM 200 or received from FCM 300, EWSM 1600 may compensate for the expansion of freezing water and the contraction of melting water, thereby flexibly utilizing space within enclosure 950. Moreover, EWSM 1600 may include a hydrogen storage module (not shown) integrated therein.

EWSM 1600 may be polyhedral in shape to facilitate its fitting into enclosure 950 of MPS 100, and may include a first vessel 1605 open at one side 1606, a second vessel 1610 open at one side 1611 and disposed at first vessel 1605 such that the open sides of each vessel 1605, 1610 are engaged with each other to define an interior 1612, and a collapsible container 1615 disposed within the interior 1612 of vessels 1605, 1610 and arranged between the engaged open sides of each vessel 1605, 1610. In an embodiment, second vessel 1610 is receivable into the opening of first vessel 1605 and is extendable from first vessel 1605. Vessels 1605, 1610 may be spring-biased toward each other in such a manner that second vessel 1610 is retained within first vessel 1605. Springs (or other suitable biasing device) 1620 may be disposed at either or both the open side, and the side opposing the open side, of second vessel 1610, thereby spring loading second vessel 1610 into first vessel 1605. A spring anchor 1630 may be disposed proximate the open side of second vessel 1610 for receiving springs 1620 and facilitating the spring bias acting upon vessels 1605, 1610. The sliding of second vessel 1610 in and out of first vessel 1605, which may be facilitated by the placement of roller bearings 1625 intermediate the engaging surfaces of each vessel 1605, 1610, allows EWSM 1600 to expand in a dimension that corresponds to an area of enclosure 950 that can accommodated such expansion.

In an embodiment, collapsible container 1615 is positioned and dimensioned to discharge water to ELM 200 and to receive water from FCM 300. Collapsible container 1615 is fabricated from a flexible material formed to define a container that, when substantially full of water, approximates the interior geometry defined by EWSM 1600 when vessels 1605, 1610 are substantially fully expanded. The material from which collapsible container 1600 may be fabricated is any material having the ability to flex under the pressures at which MPS 100 generates water that is received at collapsible container 1600.

The operation of EWSM 1600 is affected by the expansion or contraction of collapsible container 1615 in response to changes in water volume. As water is produced at FCM 300, the pressure at which the water is discharged from FCM 300 causes collapsible container 1615 to flex and expand to accommodate the water. As collapsible container 1615 expands, second vessel 1610 is biased away from first vessel 1605. Likewise, as water is removed from collapsible container 1615 and delivered to ELM 200, a negative pressure is created in collapsible container 1615 that causes collapsible container 1615 to contract. As collapsible container 1615 contracts, springs 1620 bias second vessel 1610 back into the opening of first vessel 1605.

Alternately, and now with reference to FIG. 19, an alternative EWSM 1650 may be configured to accommodate both hydrogen gas and water. In an embodiment, EWSM 1650 includes a hydrogen storage area 1655 and a water storage area 1660 separated by a movable divider 1665, which is translatable between opposing ends of EWSM 1650 along tracks 1670 disposed at the inner walls of EWSM 1650. Rollers 1675 facilitate the movement of movable divider 1665 along a length of EWSM 1650 in the directions indicated by arrows 1680. Movable divider 1665 moves in response to changes in pressure exerted upon it as a result of the charging and discharging of hydrogen gas and water through ports 1685. Hydrogen and water storage areas 1655, 1660 may be utilize collapsible containers (not shown but discussed above in reference to FIGS. 17 and 18) or other sealable units capable of expanding and contracting under the influence of pressure changes.

In embodiments of MPS 100 having an expandable water storage module, such as the EWSM 1600 for example, variations in environmental conditions, and particularly the expansion of water due to its freezing, may be compensated for. Even in the absence of freezing conditions, the nature of collapsible container 1615 may allow collapsible container 1615 to be "filled" such that no, or minimal, air is trapped over the liquid phase. Furthermore, when collapsible container 1615 is substantially empty, it may easily be exchanged for a full container.

With reference to FIGS. 1, 4, 5 and 8 collectively, MPS 100 may be maintained by removing and replacing a module 1000 by disconnecting the connection port set 910 of the module to be removed (first module 1000) from MPS 100, removing first module 1000, replacing first module 1000 with a replacement module (second module 1000) of like kind, and connecting the connection port set 910 of the second module 1000 to MPS 100. Module 1000 may be removed and replaced for general maintenance or for reasons relating to the performance of module 1000. First and second module 1000 may be an electrolyzer module 200, a power module 3000 (such as a hydrogen-fueled fuel cell module or a hydrogen-fueled generator module), a water storage module 400, a hydrogen storage module 500, a water-hydrogen storage module 1200, or a controller module 600.

Alternatively, MPS 100 may be upgraded to increase the output of MPS 100 by disconnecting the connection port set 910 of a first module 1000 from MPS 100, adding a second module 1000 to MPS 100, and connecting the connection port sets 910 of first and second modules 1000 to MPS 1000. First and second module 1000 may be any type of module discussed above.

Some embodiments of the invention may include some of the following advantages: system upgrade capability; module retrofit capability; ease of access to module connection ports; compact water-hydrogen storage arrangement; hydrogen storage arrangement having a shock absorbing structure; adaptability of water storage module to changes in water temperature; compact piping network for communication of hydrogen at high and low pressures; and, a hydrogen storage piping network capable of both charging at high pressures and discharging at regulated pressures.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A modular power system, comprising:
   an electrolysis module having a first connection port set, the first connection port set comprising a communications port adapted for communicating control signals with the electrolysis module; and
   a power module having a second connection port set;
   wherein the first connection port set is adapted for operable communication with at least one of a water supply, a hydrogen storage device, and the power module;
   the second connection port set is adapted for operable communication with at least one of the water supply, the hydrogen storage device, and the electrolysis module; and
   at least one of the electrolysis module and the power module is separately removable from the modular power system.

2. The system of claim 1, further comprising:
   at least one of a water storage module and a hydrogen storage module;
   wherein the first connection port set is adapted for operable communication with at least one of the water storage module, the hydrogen storage module, and the power module;
   the second connection port set is adapted for operable communication with at least one of the water storage module, the hydrogen storage module, and the electrolysis module; and
   at least one of the water storage module and the hydrogen storage module is separately removable from the modular power system.

3. The system of claim 1, wherein the power module comprises at least one of a hydrogen-fueled fuel cell and a hydrogen-fueled generator.

4. The system of claim 2, wherein the water storage module has a shape that conforms with the shape of the hydrogen storage module to provide an integral water-hydrogen storage module.

5. The system of claim 1, wherein the electrolysis and power modules are each disposed within a cabinet, the first and second connection port sets being disposed at the respective cabinets.

6. The system of claim 5, wherein the first and second connection ports each comprise at least one of a water connection port, a hydrogen connection port, a power connection port, and a communication connection port.

7. The system of claim 5, wherein the cabinet further comprises first and second connectors such that the first connector of a first cabinet is receivable at the second connector of a second cabinet; whereby
   at least one of a first electrolysis module and a first power module is removably connectible via the first and second connectors with at least one of a second electrolysis module and a second power module to provide an increase in output of the modular power system.

8. The system of claim 1, further comprising a controller module having a communication bus adapted for connection with at least one of the first and the second connection port set to establish operable communication with at least one of the electrolysis module and the power module, the controller module being separately removable from the modular power system.

9. The system of claim 2, further comprising a piping network disposed between the hydrogen storage module and each of the electrolysis module and the power module, the piping network configured to communicate hydrogen gas from the electrolysis module to the hydrogen storage module, and from the hydrogen storage module to the power module.

10. The system of claim 9, wherein the piping network further comprises:
    at least one piping section that is common to both the electrolysis module and the power module; and at least one valve in fluid communication with and adapted to control the flow of hydrogen gas in the common piping section.

11. The system of claim 1, further comprising:
at least one of an enclosure, a support and a rack adapted to receive at least one of the electrolysis module and the power module such that the first and second connection port sets are accessible from a side.

12. The system of claim 2, wherein the water storage module further comprises an expandable water storage module.

13. The system of claim 12, wherein the expandable water storage module comprises:
a first portion having a first open end;
a second portion having a second open end, the second open end being received at the first open end such that the first and second portions define an interior having an adjustable volume;
a collapsible container disposed within the interior; and
a biasing device disposed to bias the first portion and the second portion in a volume-reducing manner; whereby the expandable water storage module increases in volume as a result of water being added to the collapsible container, and decreases in volume as a result of water being removed from the collapsible container.

14. The system of claim 2, wherein the water and hydrogen storage modules are integrated into a water-hydrogen storage module comprising:
a water storage area and a hydrogen storage area separated by a movable divider; wherein
the movable divider is positionable to increase the volume of the water storage area in response to a decrease in the volume of the hydrogen storage area, to decrease the volume of the water storage area in response to an increase in the volume of the hydrogen storage area, to increase the volume of the hydrogen storage area in response to a decrease in the volume of the water storage area, and to decrease the volume of the hydrogen storage area in response to an increase in the volume of the water storage area.

15. An apparatus for a modular power system, comprising:
a cabinet configured to house a module of the modular power system, the cabinet having an access surface and a connection port set disposed thereat, the connection port set comprising a communications port adapted for communicating control signals with the module, wherein the cabinet includes a plurality of panels arranged to form a polyhedral structure, wherein at least one panel is angled with respect to at least one other panel, wherein the access surface is integral with the angled panel, wherein the module comprises an electrolysis module or a controller module, and wherein the connection port set is in operable communication with the module; and
whereby the connection port set is accessible from at least two directions for operably connecting two or more modules.

16. An apparatus for a modular power system, comprising:
a cabinet configured to house a module of the modular power system, the cabinet having an access surface and a connection port set disposed thereat, the connection port set comprising a communications port adapted for communicating control signals with the module wherein the cabinet includes a plurality of panels arranged to form a polyhedral structure, wherein at least one panel includes a recessed channel extending from one side of the cabinet to another wherein the access surfaces is integral with the recessed channel, wherein the module comprises an electrolysis module or a controller module, and wherein the connection port set is in operable communication with the module; and
whereby connecting hardware for connecting the connection port set of one module to another is at least partially disposed within the recessed channel.

17. An apparatus for a modular power system, comprising:
a cabinet configured to house a module of the modular power system, the cabinet having an access surface and a connection port set disposed thereat, the connection port set comprising a communications port adapted for communicating control signals with the module, wherein the cabinet further comprises first and second connectors such that the first connector of a first cabinet is receivable at the second connector of a second cabinet, wherein the module comprises an electrolysis module or a controller module, and wherein the connection port set is in operable communication with the module; and
whereby at least one of a first electrolysis module and a first power module is removably connectible via the first and second connectors with at least one of a second electrolysis module and a second power module to provide an increase in output of the modular power system.

18. A method of maintaining a modular power system, comprising:
disconnecting the connection port set of a first module from the modular power system and removing the first module, the connection port set comprising a communications port adapted for communicating control signals with the first module; and,
replacing the first module with a second module of like kind and connecting the connection port set of the second module to the modular power system, wherein at least one of the first module and the second module comprise an electrolyzer module or a controller module.

19. A method of upgrading a modular power system, comprising:
disconnecting a connection port set of a first module from the modular power system, the connection port set comprising a communications port adapted for communicating control signals with the first module; and
adding a second module to the modular power system and connecting the connection port sets of the first and second modules to the modular power system, wherein at least one of the first module and the second module comprise an electrolyzer module or a controller module.

* * * * *